(12) United States Patent
Kim et al.

(10) Patent No.: US 7,330,333 B2
(45) Date of Patent: Feb. 12, 2008

(54) HARD DISK DRIVE HOUSING HAVING ISOLATED POST TO IMPROVE MECHANICAL SHOCK RESISTANCE

(75) Inventors: Myeong Eop Kim, San Jose, CA (US); Tho Pham, Milpitas, CA (US); Anh Hoang, Santa Clara, CA (US); Yun Sik Han, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 437 days.

(21) Appl. No.: 10/870,789

(22) Filed: Jun. 16, 2004

(65) Prior Publication Data

US 2005/0280932 A1    Dec. 22, 2005

(51) Int. Cl.
*G11B 5/00* (2006.01)
(52) U.S. Cl. .................................. 360/97.01
(58) Field of Classification Search ............ 360/97.01, 360/97.02, 97.03, 99, 78.12, 294.3, 92
See application file for complete search history.

(56) References Cited

U.S. PATENT DOCUMENTS

| 5,282,101 | A | * | 1/1994 | Reinisch | 360/97.03 |
| 5,847,896 | A | * | 12/1998 | Stefansky | 360/78.12 |
| 6,061,202 | A | * | 5/2000 | Bloom et al. | 360/92 |
| 6,275,353 | B1 | * | 8/2001 | Briggs | 360/97.02 |
| 6,411,463 | B1 | * | 6/2002 | Janik et al. | 360/97.01 |
| 6,633,452 | B2 | * | 10/2003 | Hirasaka et al. | 360/97.01 |
| 6,900,962 | B1 | * | 5/2005 | Forbord | 360/97.02 |
| 6,914,747 | B2 | * | 7/2005 | Smith et al. | 360/99.08 |
| 7,012,781 | B2 | * | 3/2006 | Chee et al. | 360/97.01 |
| 7,023,667 | B2 | * | 4/2006 | Shum | 360/294.3 |

* cited by examiner

*Primary Examiner*—Tianjie Chen
(74) *Attorney, Agent, or Firm*—Ben J. Yorks; Trell & Manella LLP

(57) ABSTRACT

A hard disk drive with a post that extends from a base of a base plate. The base has a slot adjacent to the post. The slot attenuates a shock wave that propagates through the base plate of the drive.

3 Claims, 2 Drawing Sheets

HARD DISK DRIVE HOUSING HAVING ISOLATED POST TO IMPROVE MECHANICAL SHOCK RESISTANCE

BACKGROUND OF THE INVENTION

1. Field of the Invention

The present invention relates to hard disk drives.

2. Prior Art

Hard disk drives include a plurality of transducers that are magnetically coupled to a number of rotating magnetic disks. The transducers write and read information by magnetizing and sensing the magnetic field of the disks. The transducers are typically integrated into heads that are mounted to suspension arms. The suspension arms are attached to an actuator arm. Information is typically stored within data sectors located in annular tracks of the disks. The actuator arm is attached to a voice coil motor that can be energized to move the transducers to different tracks of the disks.

Each head has an air bearing surface that cooperates with an air flow generated by the rotating disks to create an air bearing between the transducers and the disk surface. The air bearing prevents mechanical wear between the disk and the head. It is desirable to minimize the air bearing gap to optimize the magnetic coupling between the transducer and the disk surface.

The disks are rotated by a spindle motor that is mounted to a base plate. The spindle motor, disks and heads are enclosed by a cover that is attached to the base plate. The cover and base plate provide a protective housing for the disk drive.

Hard disk drives are sometimes subjected to an external shock load. For example, the disk drive may be assembled into a portable computer that is dropped by the user. The assignee of the present application, Samsung Electronics, Co., Ltd., produces a hard disk drive with a plurality of posts that extend from the base plate of the drive. The posts are used to align the base plate and drive within a servo writer. The servo writer writes servo information onto the disks that is used to center the heads on the data tracks. It has been found that external shock loads may be applied to the posts of the base plate. The external shock load may create a shock wave that propagates through the housing from the posts. The shock wave can cause the heads to strike or slap the disks. The impact can cause damage to the heads and/or disks.

BRIEF SUMMARY OF THE INVENTION

A hard disk drive with a post that extends from a base of a base plate. The base has a slot located adjacent to the post. The base plate can support a spindle motor and an actuator arm. The spindle motor may rotate a disk that is magnetically coupled to a head. The head may be mechanically coupled to the actuator arm.

DETAILED DESCRIPTION

Disclosed is a hard disk drive with a post that extends from a base of a base plate. The base has a slot adjacent to the post. The slot attenuates a shock wave that propagates through the base plate of the drive.

Figure 1:
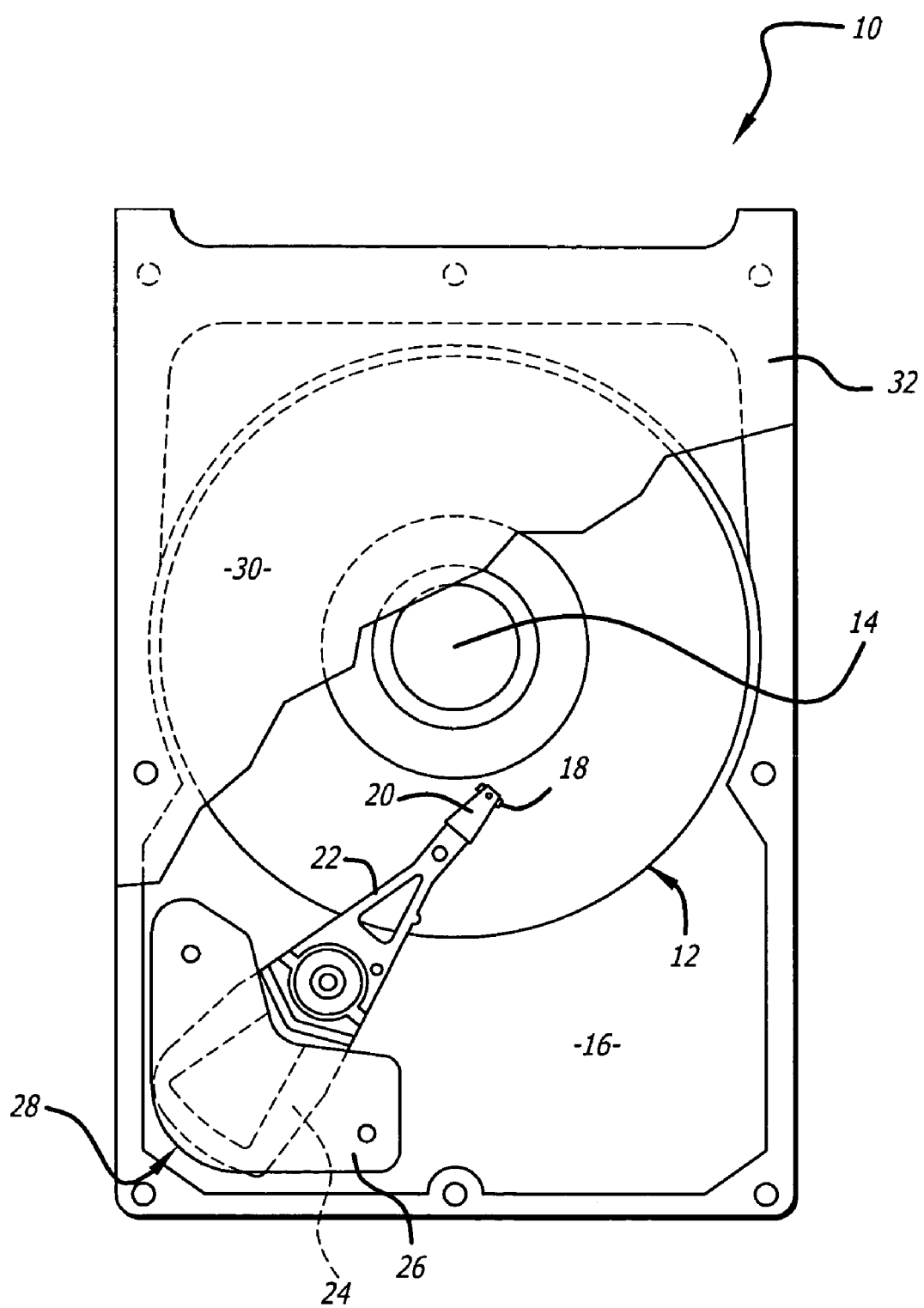
FIG. 1 is a top view of an embodiment of a hard disk drive of the present invention.

Referring to the drawings more particularly by reference numbers, FIG. 1 shows an embodiment of a hard disk drive 10 of the present invention. The disk drive 10 includes at least one disk 12 that is clamped to a spindle motor 14. The spindle motor 14 is mounted to a base plate 16.

The spindle motor 14 rotates the disk 12 relative to a head 18. The head 18 includes one or more transducers (not shown) that are magnetically coupled to the disk 12. For example, the head 18 may include one transducer to magnetize and write information onto the disk 12, and a magneto-resistive transducer that senses the magnetic field and reads information from the disk 12.

The head 18 may be gimbal mounted to a suspension arm 20 that is attached to an actuator arm 22. The actuator arm 22 may be pivotally mounted to the base plate 16. The arm 22 may have a voice coil 24 that is coupled to a magnet assembly 26. The coil 24 and magnet assembly 26 define a voice coil motor 28 that can be energized to pivot the actuator arm 22 and move the head 18 relative to the disks 12. The transducer(s), spindle motor 14 and voice coil 24 may all be coupled to an electronic controller (not shown) that operates the disk drive 10. Additionally, the components of the drive 10 may be enclosed by a cover 30 that is attached to the base plate 16.

Figure 2:
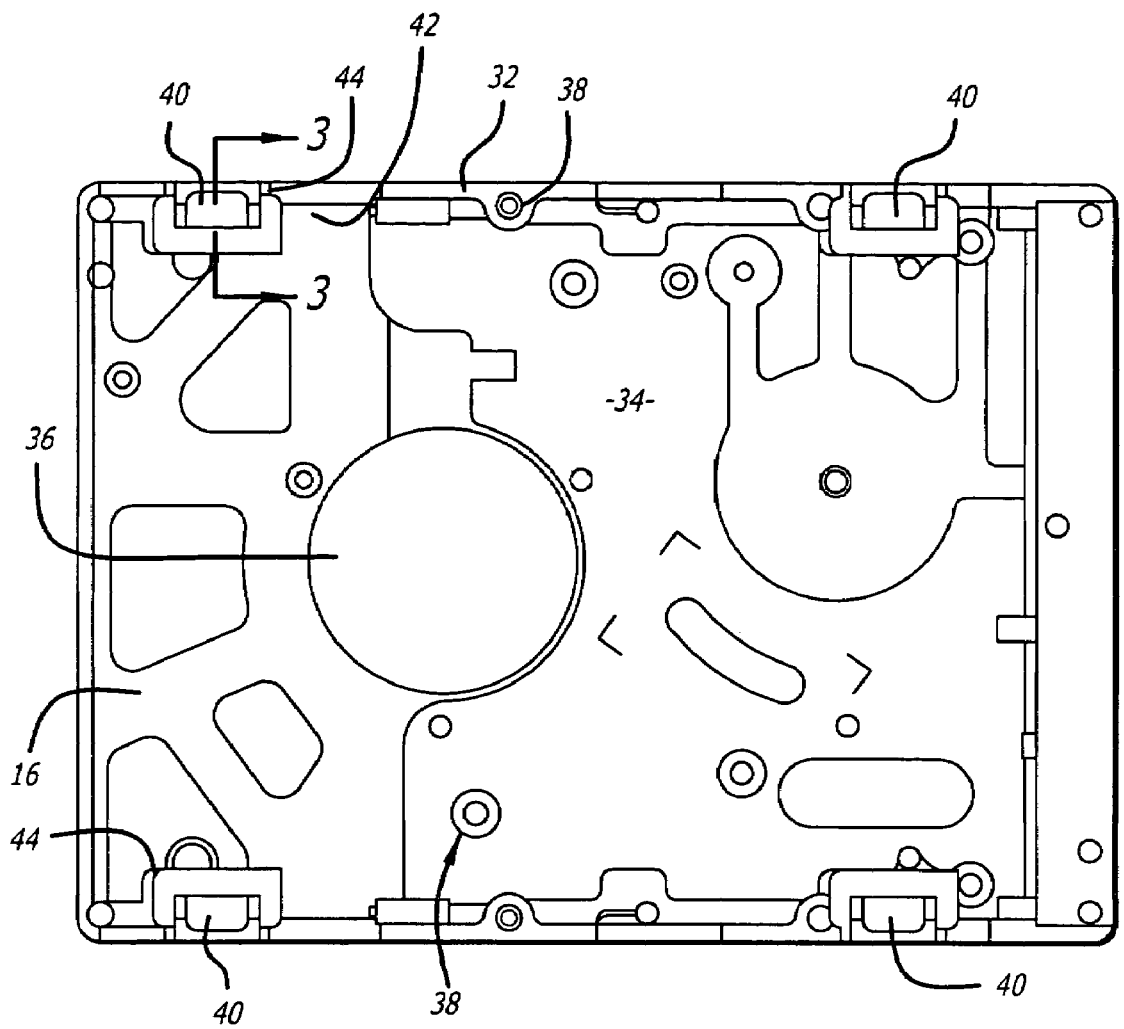
FIG. 2 is a bottom view of a base plate of the disk drive.
Figure 3:
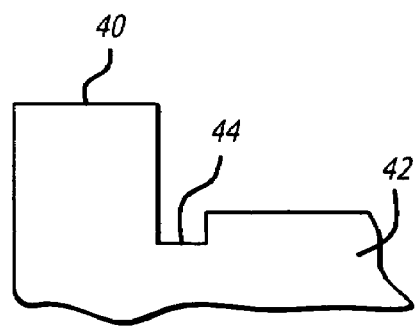
FIG. 3 is a side sectional view of the base plate shown in FIG. 2.

As shown in FIGS. 2 and 3, the base plate 16 may have an outer wall 32 that extends around an inner cavity 34. The base plate 16 may further have an opening 36 that provides access for the spindle motor 14. The base plate 16 may be attached to a printed circuit board assembly (not shown) with fasteners (not shown) screwed into threaded holes 38 of the plate 16.

The base plate 16 may further have a plurality of posts 40 that extend from a base 42. The posts 40 are used to align the base plate 16 and the disk drive 10 with a servo writer that writes servo information onto the disk 12. It has been found that when the disk drive is dropped, shock loads may propagate through the base plate 16 from the posts 40.

The base 42 may have a plurality of slots 44 located adjacent to the posts 40. The slots 44 provide discontinuities that may attenuate a shock wave(s) that propagates through the base 42. The slots 44 may also extend into the outer wall 32 to attenuate shock waves propagating through the wall 32.

As shown in FIG. 3, the slots 44 may extend down into the base 42. It is preferable to not extend the slots 44 through the base 42 so that the hard disk area remains sealed.

Table 1 provides comparison test of a disk drive without the slots 44 and drives with the slots 44. The base for a drive without a slot had a thickness of 3.10 millimeters ("mm") adjacent to the posts 40. A type I drive includes a slot approximately 1.5 mm deep, a type II drive has slots 2.2 mm deep, and a type III drive includes slots on the motor side (right hand side of drawing) that are 2.3 mm deep and slots on the actuator side (left hand side of drawing) that are 1.5 mm deep.

| | | | P80 | | Type 1 | | |
|---|---|---|---|---|---|---|---|
| | | | Ave. | Stdev | Ave. | Stdev | p_value |
| P80 vs. Type 1 | Motor | 4" | 398 | 43 | 387 | 26 | 0.387 |
| | | 5" | 455 | 42 | 428 | 22 | 0.048 |
| | Actuator | 4" | 481 | 34 | 392 | 30 | 0.000 |
| | | 5" | 532 | 19 | 436 | 17 | 0.000 |

-continued

|  |  |  | P80 | | Type 1 | | |
|---|---|---|---|---|---|---|---|
|  |  |  | Ave. | Stdev | Ave. | Stdev | p_value |
| P80 vs. Type 2 | Motor | 4" | 398 | 43 | 373 | 48 | 0.146 |
|  |  | 5" | 455 | 42 | 425 | 40 | 0.063 |
|  | Actuator | 4" | 481 | 34 | 444 | 40 | 0.012 |
|  |  | 5" | 532 | 19 | 515 | 19 | 0.025 |
| P80 vs. Type 3 | Motor | 4" | 398 | 43 | 384 | 23 | 0.016 |
|  |  | 5" | 455 | 42 | 409 | 21 | 0.002 |
|  | Actuator | 4" | 481 | 34 | 397 | 16 | 0.000 |
|  |  | 5" | 532 | 19 | 444 | 18 | 0.000 |

As is known in the industry a p-value below 0.05 is indicative of an improvement over the prior art. As shown by the table the existence of the slots 44 improves the shock characteristics of the base plate 16.

The slots 44 can be machined into the base 42 and/or formed in the casting process of the base plates 16.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a base plate that has a post that has four sides, extends from a base, said base having a C-shaped slot adjacent to said post and extends around three sides of said post to attenuate shock waves that propagate through said base plate;
   a spindle motor mounted to said base plate;
   a disk that is rotated by said spindle motor;
   an actuator arm mounted to said base plate;
   a head mechanically coupled to said actuator arm and magnetically coupled to said disk;
   a voice coil motor that can pivot said actuator arm and move said head relative to said disk; and,
   a cover that is attached to said base plate and which encloses said disk, said actuator arm, said voice coil motor and said head.

2. The hard disk drive of claim 1, wherein said post is adjacent to an outer wall in a corner of said base plate.

3. The hard disk drive of claim 2, wherein said outer wall has a slot.

* * * * *